(12) United States Patent  (10) Patent No.: US 6,644,872 B2
Kawazura  (45) Date of Patent: Nov. 11, 2003

(54) ADAPTER AND CAMERA ACCESSORY

(75) Inventor: Kenji Kawazura, Tokyo (JP)

(73) Assignee: Pentax Corporation, Tokyo (JP)

( * ) Notice: Subject to any disclaimer, the term of this patent is extended or adjusted under 35 U.S.C. 154(b) by 0 days.

(21) Appl. No.: 10/114,301

(22) Filed: Apr. 3, 2002

(65) Prior Publication Data

US 2002/0154913 A1 Oct. 24, 2002

(30) Foreign Application Priority Data

Apr. 23, 2001 (JP) ......................................... 2001-124057

(51) Int. Cl.⁷ ................................................ G03B 17/38
(52) U.S. Cl. ........................................................ 396/504
(58) Field of Search ........................................ 396/504

(56) References Cited

U.S. PATENT DOCUMENTS 2,949,838 A * 8/1960 Skalabrin .................... 396/425
5,255,038 A   10/1993 Suzuka
5,325,143 A    6/1994 Kawano
5,993,246 A * 11/1999 Moldenhauer et al. ...... 439/474

OTHER PUBLICATIONS

"Minolta a–7 User's Manual", p. 199, including English Language Translation.

* cited by examiner

Primary Examiner—David Gray
(74) Attorney, Agent, or Firm—Greenblum & Bernstein, P.L.C.

(57) ABSTRACT

An adapter has a plug, a jack, and a flexible cable, which connects the plug and the jack. The plug is connected to a socket provided in a camera body. The jack is connected to a camera accessory, which is a release switch device, for example. The jack is provided with a clip which is fixed to a strap attaching ring provided on the camera body or a strap attached to the strap attaching ring.

8 Claims, 5 Drawing Sheets

ADAPTER AND CAMERA ACCESSORY

BACKGROUND OF THE INVENTION

1. Field of the Invention

The present invention relates to a camera accessory which is connected to a camera body through a cable.

2. Description of the Related Art

Conventionally, there is known a camera accessory connectable to a camera body, which includes a release switch device for carrying out photography at a place separated from the camera body, an adapter, a connecting cord, and an extension cord. Each of the camera accessories has a flexible cable connecting the accessory body to a plug, which is connected to a socket provided in the camera body.

If the connecting force between the socket and the plug is too small, the camera accessory may be disconnected from the camera body by accidentally pulling the accessory, which will impede the photographing operation. Therefore, for strengthening the connection between the socket and the plug, it is possible for the plug to be provided with a special mechanism or for the configuration of the socket to be changed. However, this would cause the structure of the plug or socket to become complex, and would mean that the plug could not be used for a conventional camera or accessory.

Further, the camera accessory with a cable has another problem, in which, if photography is performed while the camera accessory is swinging without being fixed, the cable may be positioned in front of the photographing lens, so that the image of the cable may appear in a photographed picture, which impedes the photography.

SUMMARY OF THE INVENTION

Therefore, an object of the present invention is to provide a camera accessory, which is prevented from disconnecting from the socket and which does not impede photography.

According to the present invention, there is provided an adapter comprising a first connector, a second connector, and a flexible cable that connects the accessory to the camera body. The first connector is connected to the camera body. The second connector is connected to a camera accessory. The second connector is provided with a clip which is fixed to one of a strap attaching portion provided on the camera body and a strap attached to the strap attaching portion. The flexible cable connects the first and second connectors.

Further, according to the present invention, there is provided a camera accessory comprising a connector, a holding portion, and a flexible cable. The connector is connected to the camera body. The holding portion is provided with a clip which is fixed to one of a strap attaching portion provided on the camera body and a strap attached to the strap attaching portion. The flexible cable connects the connector and the holding portion.

BRIEF DESCRIPTION OF THE DRAWINGS

The objects and advantages of the present invention will be better understood from the following description, with reference to the accompanying drawings in which.

DESCRIPTION OF THE PREFERRED EMBODIMENTS

Figure 1:
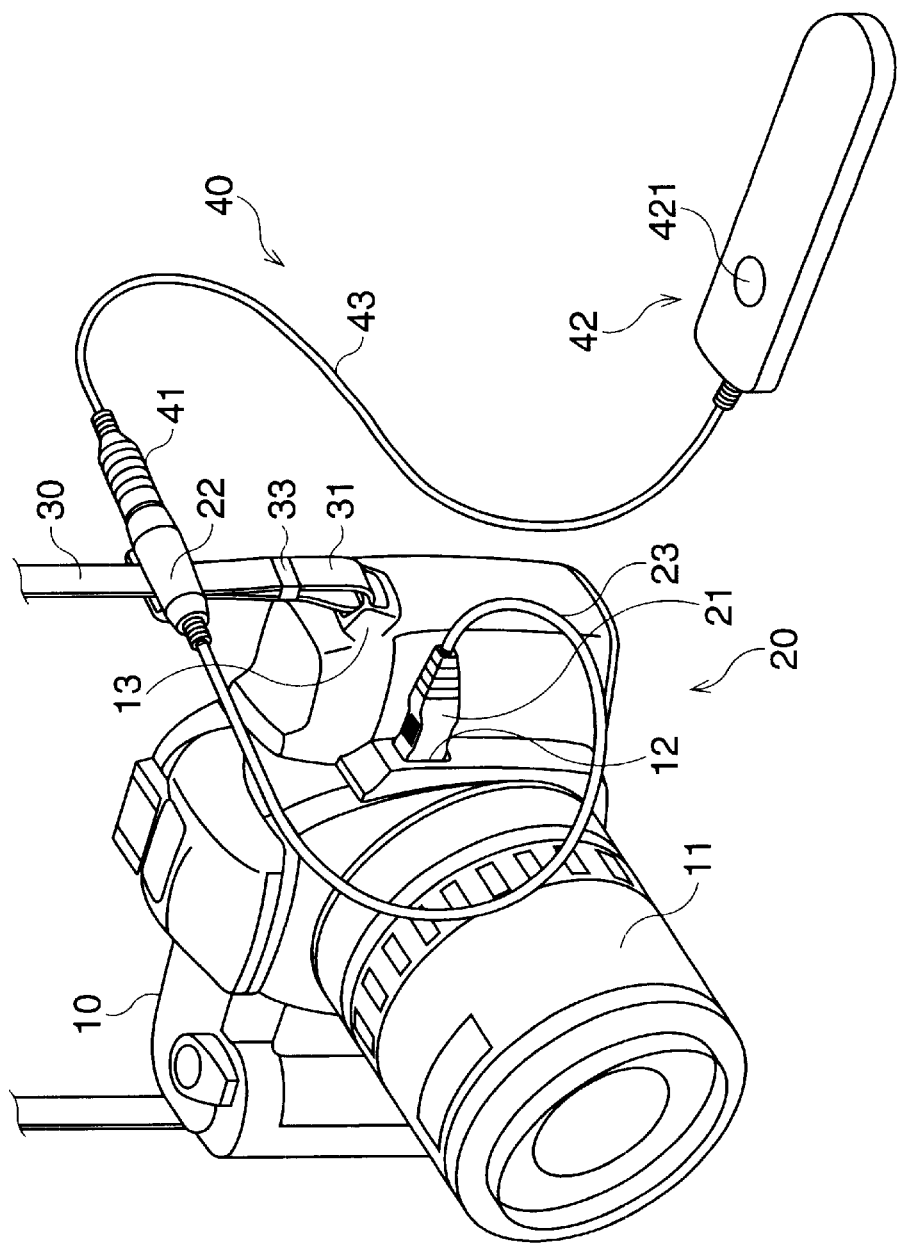
FIG. 1 is a perspective view showing a camera to which an adapter of a first embodiment is attached.

The present invention will be described below with reference to the embodiments shown in the drawings.

FIG. 1 is a perspective view showing a single-lens reflex camera to which an adapter or camera accessory of a first embodiment is attached.

A strap attaching ring 13 is provided on a side surface of a camera body 10, and projects from the camera body 10. One end portion 31 of a strap 30 is placed through the strap attaching ring 13, and fastened by a fastener 33 to form a loop, and is therefore connected to the strap attaching ring 13. Another end portion (not shown) of the strap 30 is connected to another side surface of the camera body 10, with the same construction. Thus, the camera may be used in a suspended condition, as shown in the drawing.

A socket 12 is provided close to a lens barrel 11 mounted on a front surface of the camera body 10. Various kinds of camera accessories, which cannot be directly connected to the socket 12, are connected to the socket 12 through an adapter 20.

The adaptor 20 has a plug (i.e., first connector) 21 connected to the socket 12, a jack (i.e., second connector) 22 connected to the camera accessory, and a flexible cable 23 connecting the plug 21 and the jack 22.

The jack 22 is fixed to the strap 30 with a clip which will be described later. It is preferable that the jack 22 is fixed to a portion close to the end portion 31 of the strap 30, i.e., a portion close to the camera body 10.

A release switch device 40 (i.e., the camera accessory) is connected to the socket 12 through the adaptor 20. A plug 41 of the release switch device 40 cannot be connected to the socket 12 directly, but is connected to the jack 22. The plug 41 is provided at one end of the cable 43, and an operation unit 42 is provided at the other end of the cable 43. The operation unit 42 is provided with a release button 421. When the release button 421 is operated, a control signal commanding the start of photography is generated, and transmitted to the camera body 10 through the adaptor 20.

The release switch device 40 is held by a hand of the user, when in use, and at that time, the cable 43 may be pulled to separate from the camera, so that the pulling force may be transmitted to the adapter 20 through the plug 41. Nevertheless, since the jack 22 of the adapter 20 is attached and fixed at the strap 30, the jack 22 is moved when twisting the strap 30. The displacement of the jack 22 is absorbed due to deformation of the cable 23, and is not significantly transmitted to the plug 21. Thus, the plug 21 is not directly pulled by the jack 22. Therefore, the plug 21 is prevented from largely moving, and cannot be disconnected from the socket 12.

Figure 2:
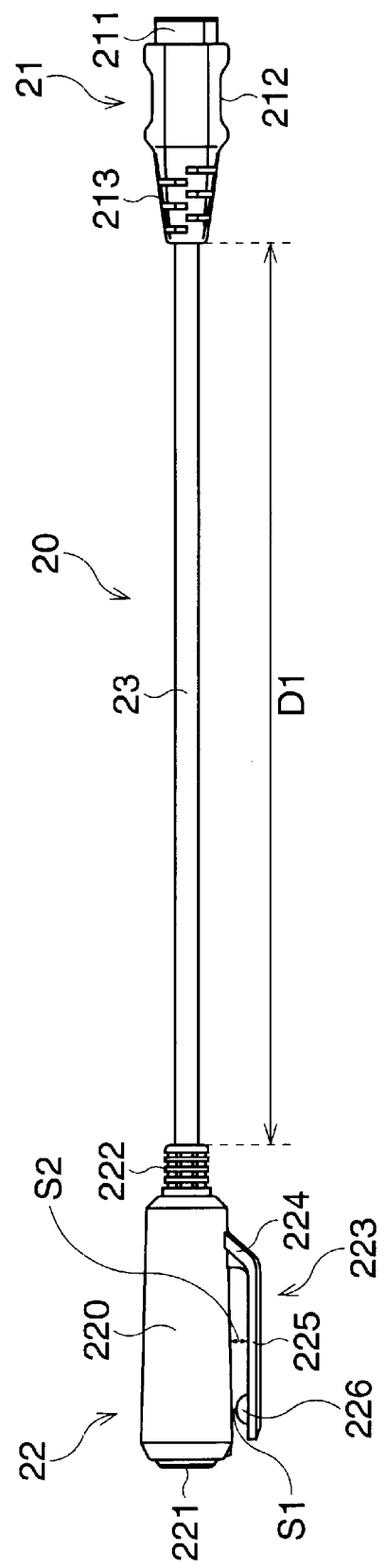
FIG. 2 is a plan view showing the adapter.

FIG. 2 is a plan view of the adapter 20.

The jack 22 has a cylindrical jack body (i.e., connector body) 220. A plug holding hole 221 is formed in the central portion of the jack body 220. The plug 41 of the release switch device 40 (see FIG. 1) is connected to the plug holding hole 221.

The jack 22 is provided with a clip 223 having elasticity. The clip 223 is integrally formed on the jack body 220, and has a fixed portion 224 projected from an outer surface of the jack body 220, and an arm portion 225 extending from the fixed portion 224 in a direction substantially parallel to the longitudinal direction of the jack body 220. The arm portion 225 has a projection 226 projecting to the connector body 220 from a tip portion of the arm portion 225. A gap S1 is formed between the projection 226 and the jack body 220. The gap S1 is less than the thickness of the strap 30 (see FIG. 1). A space S2 formed between the arm portion 225 and the jack body 220 is greater than the thickness of the strap 30, and is less than twice the thickness of the strap 30.

The jack 22 has a bend portion 222, to which the cable 23 is connected. A plurality of ribs, which extend in a direction perpendicular to the longitudinal direction of the cable 23, are formed in the bend portion 222. The bend portion 222 restrains extreme bending of the end portion of the cable 23, to prevent fatigue of the end portion of the cable 23.

The cable 23 has flexibility, and bends depending upon the relative position between the plug 21 and the jack 22. The length D1 of the cable 23 is such that, while the adaptor 20 is attached to the camera body 10, even if the jack 22 is displaced to some extent, the displacement is prevented from being transmitted to the plug 21.

The plug 21 has a distal end portion 211 which can be attached to the socket 12 (see FIG. 1). A slip-prevention groove 212 is formed on an outer surface of the plug 21 so as to make it easy to attach to and detach from the socket 12. The plug 21 has a bend portion 213 similar to the jack 22, and the cable 23 is connected to the bend portion 213.

The jack 22 is attached to the strap 30 as described below. When the jack 22 is moved in the breath direction of the strap 30 from the projection 226 side of the clip 223, the projection 226 engages the surface of the strap 30 so that the arm portion 225 is elastically deformed to separate the projection 226 from the jack 22, and the projection 226 then gets over the strap 30 and the arm portion 225 is restored to the original position. In this state, the strap 30 is sandwiched between the outer surface of the jack 22 and the rear surface of the arm portion 225, so that the jack 22 is fixed to the strap 30.

The strap 30 is a belt having roughly uniform thickness, and the end portion 31 of the strap 30 is folded as described previously. Therefore, in a portion close to the end portion 31, the belt is two-folded. The two-folded portion has approximately twofold thickness in comparison with the other portion of the strap 30, and is thicker than the space S2 of the jack 22.

When the strap 30 is tensioned upward as shown in FIG. 1, the two-folded portion is positioned at the lower end of the strap 30. Therefore, the jack 22 attached to the strap 30 is stationary when engaging with the two-folded portion. Conversely, when the strap 30 hangs, i.e., when the two-folded portion is positioned at the upper end of the strap 30, the jack 22 may descend along the strap 30. In this case, if the jack 22 easily descends, the strap 30 has to be folded, and then sandwiched by the clip 223 to prevent the jack 22 from sliding along the strap 30.

The jack 22 is preferably fixed in such a manner that the plug holding hole 221 is positioned to the rear side of the camera body 10 as shown in FIG. 1. Due to this, the release switch device 40 connected to the plug holding hole 221 is extended toward the rear side. Further, the release switch device 40 does not interfere with the adapter 20 located in front of the camera body 10, nor is it positioned in front of the lens barrel 11.

As described above, the jack 22 will not come off from the strap 30 even if pulled by the release switch device 40, the plug 21 cannot be directly pulled by the release switch device 40. Since the cable 23 has a sufficient length D1 so as to absorb the displacement of the jack 22, the plug 21 cannot be pulled even if the jack 22 is moved. Furthermore, the jack 22 does not impede a photographing operation, by positioning the jack 22 in such manner that the release switch device 40 is located behind the camera body 10.

Figure 3:
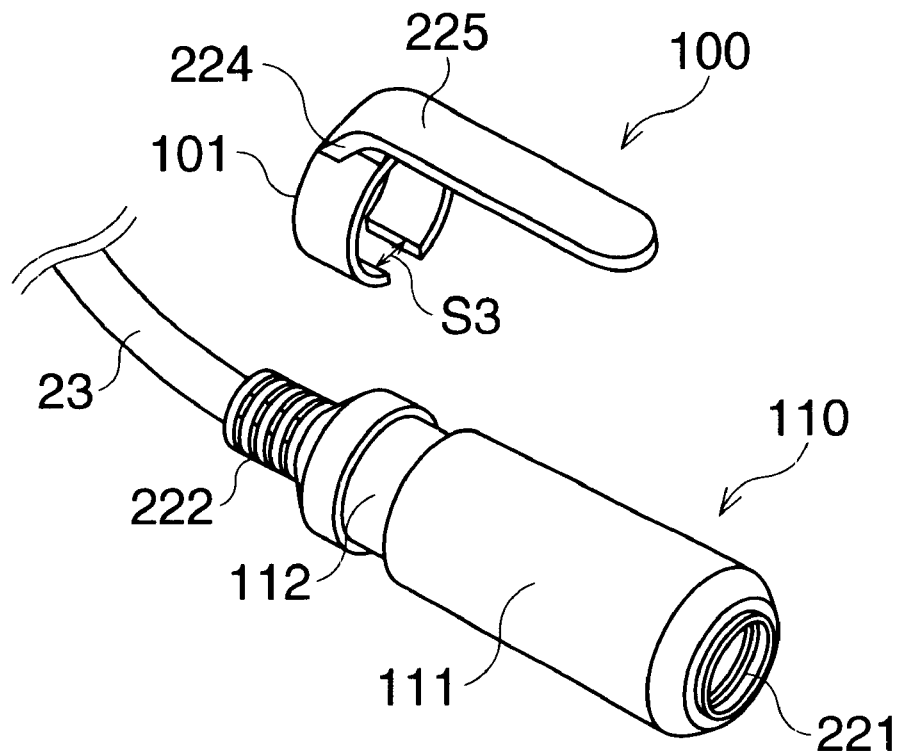
FIG. 3 is a perspective view showing a jack or connector of a second embodiment, in a disassemble state.

A second embodiment will be described below, with reference to FIG. 3. Although the clip 223 is integrally formed on the jack body 220 in the first embodiment, a clip 100 is a different member from a jack body 111, but is attachable thereto, in the second embodiment. Note that, in FIG. 3, the same parts as those of the first embodiment are given the same reference numerals.

The jack body 111 is cylindrical, and has a clip attaching groove 112 on a portion close to a bend portion 222, which extends around the circumference of the jack body 111. The clip 100 has a jack holding ring 101, which has elasticity and is fit on the clip attaching groove 112. A fixed portion 224 is projected from an outer surface of the jack holding ring 101, and an arm portion 225 extends from the fixed portion 224.

The jack holding ring 101 has an inner diameter which is less than an outer diameter of the clip attaching groove 112. The jack holding ring 101 has a gap S3, extending in the axial direction of the jack holding ring 101 so that the jack holding ring 101 can be elastically expanded, and is attached to and detached from the clip attaching groove 112.

According to the second embodiment, when the jack 110 does not have to be fixed to the strap, for example, the clip 100 can be removed from the jack 110.

Figure 4:
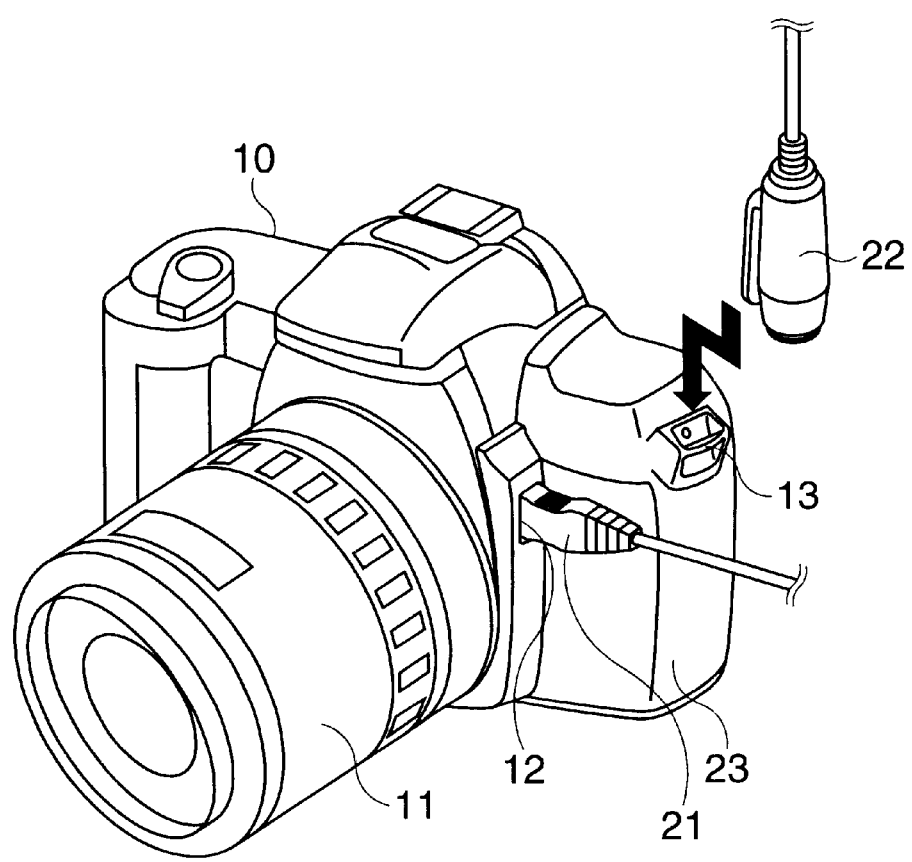
FIG. 4 is a perspective view showing another example of the connection of the jack.

Note that, although the jacks 22 and 110 are fixed to the strap 30 in the first and second embodiments, the jack 22 may be fixed to the camera body 10 or the strap attaching ring 13, as shown in FIG. 4.

Figure 5:
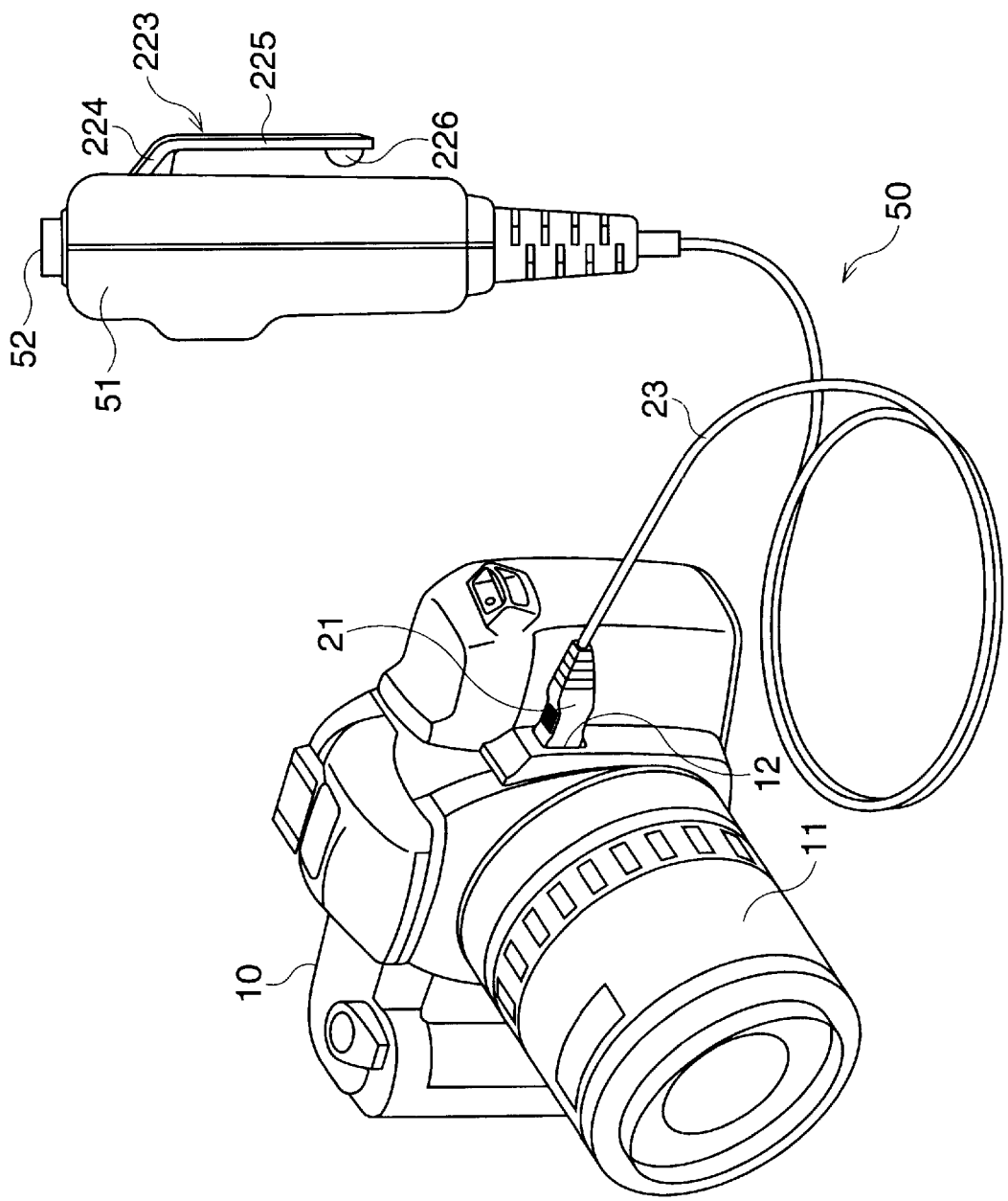
FIG. 5 is a view showing a camera to which a release switch device of a third embodiment is attached.

Although the camera accessory is the adapter 20 in the first and second embodiments, the present invention is not restricted to the adapter 20. FIG. 5 shows a third embodiment, in which the present invention is applied to a release switch device.

A clip 223 is formed on an operating unit (i.e., holding portion) 51 of the release switch device 50 which can be directly connected to the socket 12 of the camera body 10. The operating unit 51 is provided with a release button (i.e., switch member) 52. When the release button 52 is manually depressed, a control signal commanding the start of a photographing operation is generated, and is transmitted to the camera body 10 through the cable 23. The other structures are identical with those of the first embodiment.

Since the operating unit 51 is provided with the clip 223, the operating unit 51 can be fixed to the strap attaching ring 13 or the strap 30. Thus, since the operating unit 51 and the cable 23 do not hang, the user can smoothly perform a photographing operation. Further, according to the third embodiment, the same effect as those of the first and second embodiments can be obtained.

Although the embodiments of the present invention have been described herein with reference to the accompanying drawings, obviously many modifications and changes may be made by those skilled in this art without departing from the scope of the invention.

The present disclosure relates to subject matter contained in Japanese Patent Application No. 2001-124057 (filed on Apr. 23, 2001) which is expressly incorporated herein, by reference, in its entirety.

What is claimed is:

1. An adapter of a camera, comprising:

a first connector that is connected to a camera body;

a second connector that is connected to a camera accessory, said second connector being provided with a clip which is fixed to one of a strap attaching portion provided on said camera body and a strap attached to said strap attaching portion; and a flexible cable that connects said first and second connectors.

2. An adapter according to claim 1, wherein said camera accessory has a plug which cannot be connected to the camera body and can be connected to said second connector.

3. An adapter according to claim 1, wherein said second connector comprises a connector body, and said clip comprises a fixed portion, which is fixed to said connector body, and an arm portion, which extends from said fixed portion in a direction substantially parallel to the longitudinal direction of said connector body and which has a projection projecting to said connector body from a tip portion of said arm portion.

4. An adapter according to claim 3, wherein said connector body is cylindrical and has a clip attaching groove extending around the circumference of said connector body, and said clip has a holding ring which is fit on said clip attaching groove.

5. An adapter according to claim 4, wherein said holding ring has an inner diameter which is less than an outer diameter of said clip attaching groove, and has a gap extending in the axial direction of said holding ring so that said holding ring can be elastically expanded.

6. A camera accessory comprising:

a connector that is connected to a camera body;

a holding portion that is provided with a clip which is fixed to one of a strap attaching portion provided on said camera body and a strap attached to said strap attaching portion; and a flexible cable that connects said connector and said holding portion; said connector fixed to a first end of said flexible cable and said holding portion fixed to a second end of said flexible cable.

7. A camera accessory according to claim 6, wherein said clip comprises a fixed portion, which is fixed on said holding portion, and an arm portion, which extends from said fixed portion in a direction substantially parallel to the longitudinal direction of said holding portion and which has a projection projecting to said holding portion from a tip portion of said arm portion.

8. A camera accessory according to claim 7, wherein said holding portion is provided with a manually operated switch member.

* * * * *